United States Patent
Eschbach

(10) Patent No.: US 6,816,285 B1
(45) Date of Patent: Nov. 9, 2004

(54) DIGITAL DARKER/LIGHTER FOR HALFTONE IMAGES

(75) Inventor: Reiner Eschbach, Webster, NY (US)

(73) Assignee: Xerox Corporation, Stamford, CT (US)

(*) Notice: Subject to any disclaimer, the term of this patent is extended or adjusted under 35 U.S.C. 154(b) by 763 days.

(21) Appl. No.: 09/722,914

(22) Filed: Nov. 27, 2000

(51) Int. Cl.$^7$ .......................... H04N 1/405; G06K 15/00
(52) U.S. Cl. ...................... 358/3.06; 358/3.03; 382/252
(58) Field of Search ............................... 358/2.99, 3.03, 358/3.05, 3.06, 1.9; 382/232, 237, 252, 274

(56) References Cited

U.S. PATENT DOCUMENTS

| | | | |
|---|---|---|---|
| 5,258,854 A | | 11/1993 | Eschbach |
| 6,185,006 B1 | * | 2/2001 | Yoshida ...................... 358/1.9 |
| 6,751,358 B1 | * | 6/2004 | Mantell et al. ............. 382/252 |

* cited by examiner

Primary Examiner—Thomas D. Lee
(74) Attorney, Agent, or Firm—Fay, Sharpe, Fagan, Minnich & McKee, LLP

(57) ABSTRACT

A method for adjusting the lightness/darkness of a binary halftone image includes receiving digital image data defining a binary halftone image in terms of a plurality of light pixels having a first value and a plurality of dark pixels having a second value. If the binary halftone image is to be lightened, the first value for each light pixel is moved in a direction away from the second value by a select amount so that it lies outside of the valid dynamic range. If the binary halftone image is to be darkened, the second value for each dark pixel is moved in a direction away from the first value by a select amount so that it lies outside of the valid dynamic range. Error diffusion is then performed on the binary halftone image to move all pixel values into the dynamic range. In the case of lightening the image, the error diffusion operation converts some dark pixels to light pixels. In the case of darkening the image, the error diffusion operation converts some light pixels to dark pixels. Propagated error in the error diffusion operation is limited by a preset amount.

15 Claims, 6 Drawing Sheets

FIG. 4A
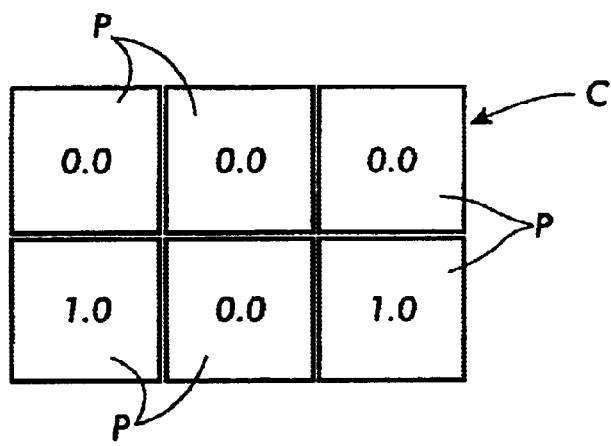
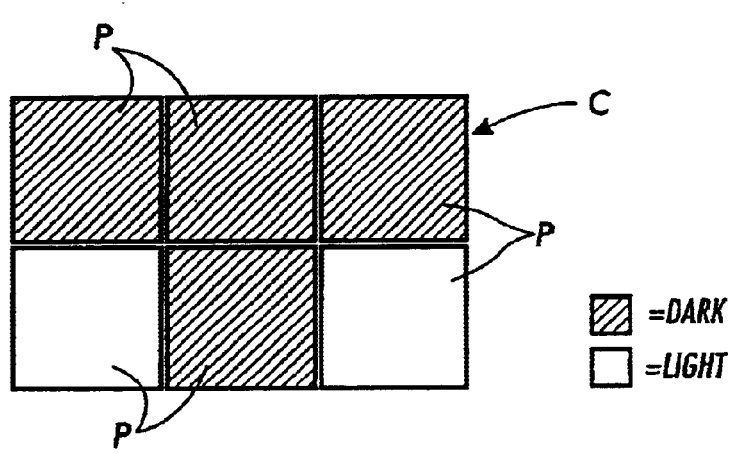
FIG. 4B

FIG. 5A
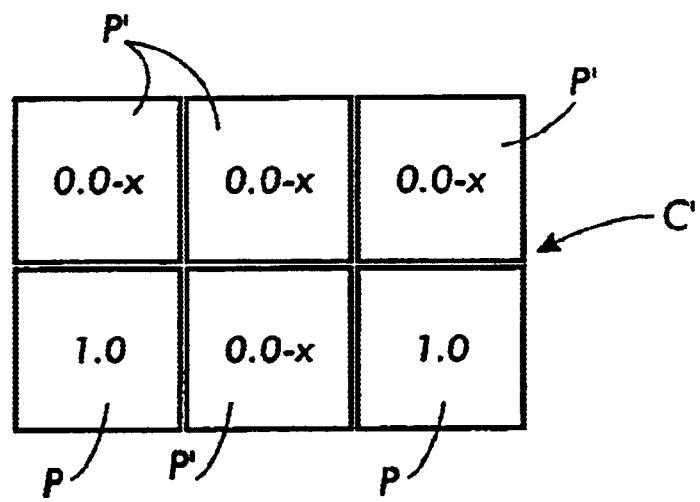
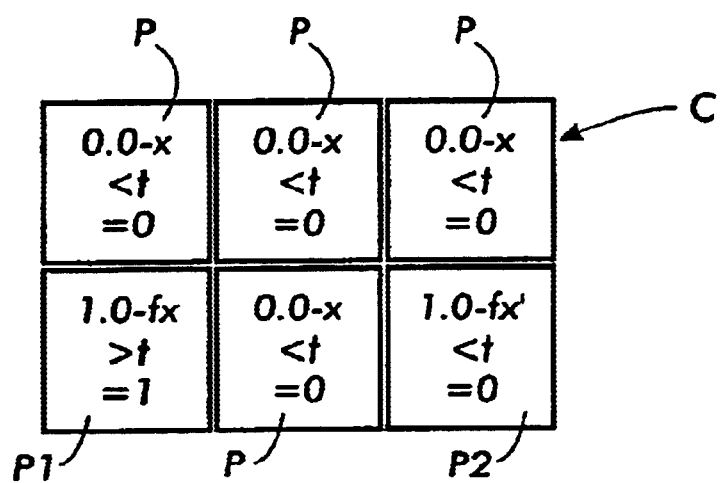
FIG. 5B

US 6,816,285 B1

DIGITAL DARKER/LIGHTER FOR HALFTONE IMAGES

BACKGROUND OF THE INVENTION

The present invention relates to the digital image processing arts. It is particularly related to processing of binary halftone images for purposes of controlling darkness/lightness levels. Binary halftone images are often "black and white" images, and the present invention is described with reference thereto for ease of understanding. However, it is not intended that the invention be limited to black-and-white images, but multi-separation color images are explicitly included.

To lighten or darken a digital image defined by a plurality of pixels expressed in terms of a gray scale, the input data is subjected to a tone reproduction curve (TRC) that maps the input pixel gray values to lighter/darker values as desired. However, for binary images, such a simple operation is not possible given that each pixel is defined as one of two different possible values.

A large amount of "print-ready" binary halftone images exist in image archives as legacy documents or in "far away memory" such as fax machines and remote copy print. These binary halftone images are defined by a bitmap or array of pixels having "m" columns and "n" rows. Each pixel is binary, i.e., it is defined in one of two possible states such as, for example: (i) "on" or "1" to indicate the presence of a first state such as white; and, (ii) "off" or "0" to indicate a second state such as black.

In a halftone image, an adjacent group or cell of binary pixels, referred to as a halftone dot, are used to simulate gray levels between the two binary states. The gray level of the cell is varied by controlling the number of on/off pixels in the cell. The human visual system possesses a limited frequency response and, to a good approximation, spatially integrates the binary data within the cell to derive an overall gray level of the cell.

It is desirable to be able to process binary halftone images to at least some degree to enhance their appearance. For example, it is highly desirable to be able to lighten or darken a binary halftone image. Unfortunately, virtually all image processing is "locked" in the data.

The technique disclosed in commonly assigned U.S. Pat. No. 5,258,854 to Eschbach allows for darkness/lightness control of binary halftone images. While this prior method is highly effective, it relies upon an output data resolution that is higher than the input data resolution during at least the processing of the data. Therefore, it is generally more complex and time-consuming to implement and, thus, not suited for all image processing platforms or environments.

Coarse adjustment of darkness and lightness can be achieved simply by directly adding white or black pixels to the image data as desired. For example, to darken and image, additional black pixels can be added using morphological operations. To lighten and image, white pixels are added. This results in very coarse lightness/darkness adjustment and generally leads to sub-optimal results.

In light of the foregoing a need has been identified for a digital image processing method and apparatus for controlling lightness and darkness in a binary halftone image in an efficient manner without degrading image quality.

SUMMARY OF THE INVENTION

In accordance with the present invention, a novel and unobvious method and apparatus are provided for controlling lightness/darkness in binary halftone digital images In accordance with one aspect of the invention a method for adjusting the lightness/darkness of a binary halftone image includes receiving digital image data defining a binary halftone image in terms of a plurality of light pixels having a first value and a plurality of dark pixels having a second value. If the binary halftone image is to be lightened, adjusting the first value in a direction away from the second value by a select amount for each of the plurality of light pixels. If the binary halftone image is to be darkened, adjusting the second value in a direction away from the first value by a select amount for each of the plurality of dark pixels. An error diffusion operation is then performed on the binary halftone image.

One advantage of the present invention resides in the provision of a method and apparatus for controlling lightness/darkness in binary halftone digital images wherein only strict pointwise operations and error diffusion type operations are performed so that the bit depth and resolution of the input image equals the bit depth and resolution of the output image.

Another advantage of the present invention is found in the provision of a method and apparatus for controlling lightness/darkness in binary halftone digital images wherein halftone dot spacing and position are maintained.

A further advantage of the present invention resides in the provision of a method and apparatus for controlling lightness/darkness in binary halftone digital images wherein processing error is controlled to prevent instabilities in the resulting output image.

Still other benefits and advantages of the present invention will become apparent to those of ordinary skill in the art to which the invention pertains upon reading and understanding this specification.

BRIEF DESCRIPTION OF THE DRAWINGS

The invention comprises a variety of components and arrangements of components, and a variety of steps and arrangements of steps, preferred embodiments of which are disclosed herein and illustrated in the accompanying drawings that form a part hereof and wherein:

FIG. 4A diagrammatically illustrates a single halftone cell of the image of FIG. 2A showing one example of pixel values;

FIG. 4B diagrammatically illustrates the single halftone cell of FIG. 4A without the pixel values;

FIG. 5A diagrammatically illustrates the halftone cell of FIG. 4A after an initial darkening step that results in adjusted pixel values;

FIG. 5B diagrammatically illustrates the single halftone cell of FIG. 5A after it has been subjected to error diffusion;

DETAILED DESCRIPTION OF THE PREFERRED EMBODIMENTS

Figure 1:
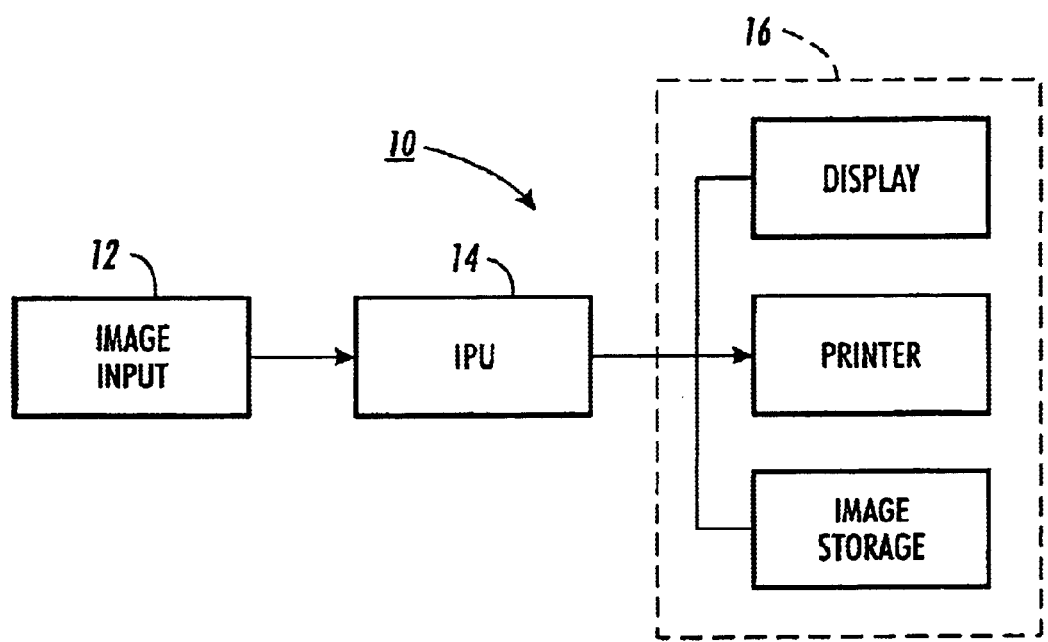
FIG. 1 is a diagrammatic illustration of a digital image processing apparatus or system for implementing a digital darker/lighter method in accordance with the present invention.

Referring now to the drawings wherein the showings are for the purpose of illustrating preferred embodiments of the invention only and not for limiting same, FIG. 1 illustrates a digital image processing system 10 comprising an image input terminal 12, an image processing unit 14, and an image output terminal 16. The image input terminal 12 is provided, for example, by an archive image storage device, a facsimile device or any other source of print-ready binary halftone images. The image input terminal 12 supplies digital image data that defines the binary halftone images to the image processing unit 14 for darkening or lightening in accordance with the present invention (and any other desired image processing operations). The image processing unit 14 comprises a digital copier, a personal computer or other computer apparatus adapted for receiving digital image data and modifying same according to an image processing method. Subsequent to image processing, the image processing unit 14 supplies the digital image data to the image output terminal 16 that comprises, for example, a video display, a printer and/or an image storage device.

Figure 2A:
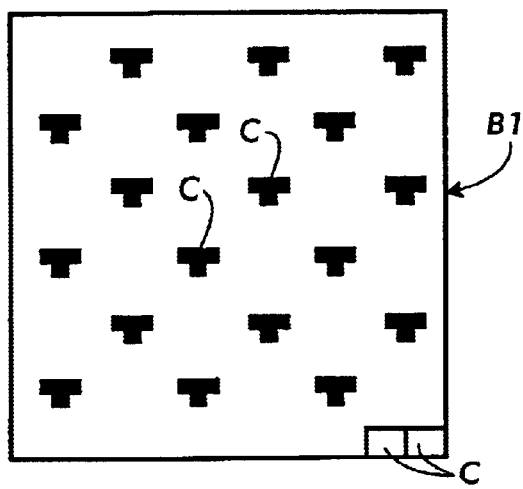
FIG. 2A illustrates a binary halftone image.

Referring now also to FIG. 2A, the image input terminal 12 supplies digital data that define a binary halftone image B1. The image B1 comprises a plurality of halftone cells C including, in this example, 50 pixels, each of which is has one of two different values or states—"on" or "off." These two different states are often represented numerically by the bits "1" and "0" as is well known. In the present example, as shown in FIG. 4A, black corresponds to the value 0 and white corresponds to the value 1. For simplicity, only six pixels of the 50 pixels are shown in FIG. 4, the remaining, non-shown pixels all have the same value of "on". Of course, the bitmap can be used to describe a different color separation and two colors other than black and white can be represented. However, black and white or dark and light are used in the present examples for ease of understanding the invention. A dynamic range is defined inclusively between the two possible pixel values, indicating that there is nothing lighter than "white" or darker than "black".

In a conventional non-binary darkening method, the image is darkened by lowering the input values and limiting the result to the dynamic range between black and white. As a simple example one might perform the following mapping: 0→0, 0.1→0, 0.2→0.1, 0.3→0.2, etc., where all values are reduced by 0.1. Extending this concept to the case of binary halftone images leads to the mapping of 0→0, 1→0.9, since only two possible input values are present. The result of this operation is that the new image no longer conforms to the binary data requirement of having only "on" and "off" pixels in its description. In order to transform the image into a binary image, an error diffusion algorithm might be used. "Error diffusion" is one commonly employed halftoning method and is taught in "An Adaptive Algorithm for Spatial Greyscale," Floyd and Steinberg, Proceedings of the SID 17/2, 75–77 (1976). Numerous other error diffusion methods are known. For example, commonly assigned U.S. Pat. No. 5,565,994 to Eschbach describes an error diffusion method particularly suited for application to multiple separation color documents. The foregoing documents are hereby expressly incorporated by reference herein for their teachings.

Figure 2B:
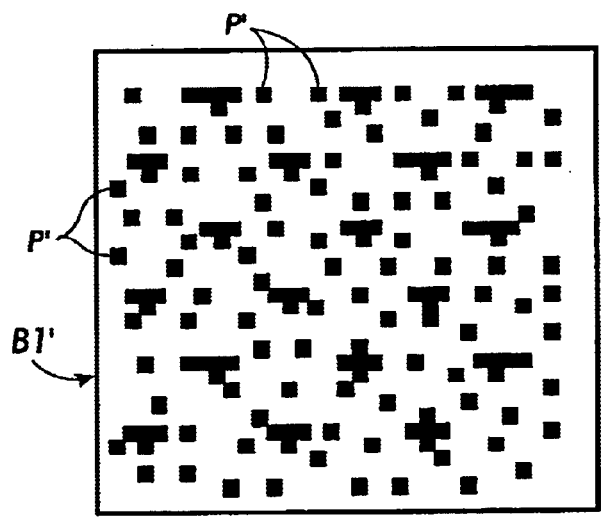
FIG. 2B illustrates the binary halftone image of FIG. 2A as darkened by one conventional method.

In this way, the binary halftone image B1 is darkened as shown in FIG. 2B effectively by adding black pixels P' to the image in the white regions. The image B1' is darker than the image B1, but image quality is sub-optimal. By design, black pixels P' are located in the image B1' at regions where no black pixels were previously located. As an additional point, the image in FIG. 2B also is less stable to printing process variations as are common for example in offset or xerographic printing.

Figure 3A:
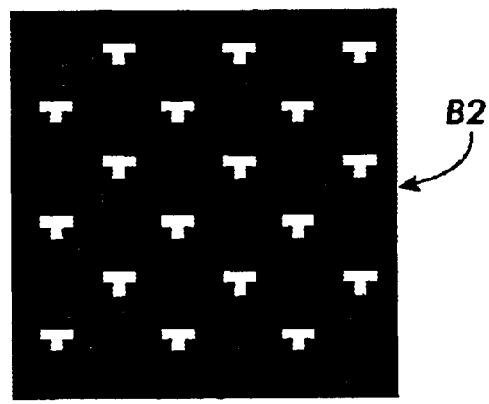
FIG. 3A illustrates a second binary halftone image.
Figure 3B:
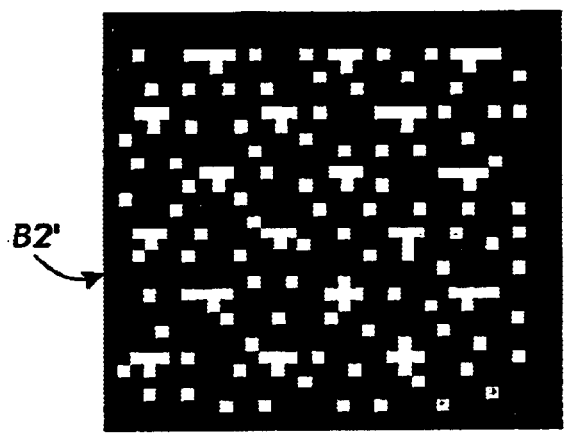
FIG. 3B illustrates the binary halftone image of FIG. 3A as lightened by one conventional method.

FIGS. 3A and 3B correspond to FIGS. 2A and 2B. However, FIGS. 3A and 3B illustrate the opposite case, where a binary halftone image B2 is lightened by addition of white pixels thereto in regions formerly defined by only black pixels. Again, while the image B2' is lighter, its quality has been degraded.

From the above description, it is obvious that standard pointwise operations, optionally followed by error diffusion or the like, are not sufficient for the darker/lighter operation desired.

Figure 6:
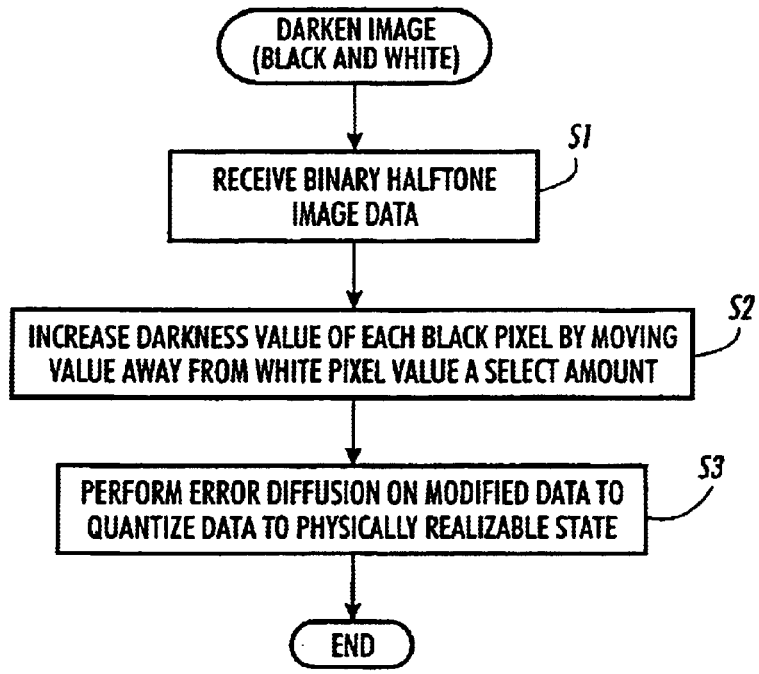
FIG. 6 is a flow chart that discloses a method of darkening a binary halftone digital image in accordance with the present invention; and, FIG. 7 is a flow chart that discloses a method of lightening a binary halftone digital image in accordance with the present invention.

A method for darkening a binary halftone image such as the image B1 is illustrated in FIG. 6. In a step S1, the binary halftone image B1 is received. Again, the binary halftone image B1 is defined by a plurality of halftone cells C each made up from a plurality of pixels P, wherein each pixel P has one of two values (1 or 0 in the present example) as shown in FIG. 4A.

In a step S2, each black pixel P of each halftone cell C is made darker or blacker to define a new, modified halftone cell C' (see FIG. 5A) with modified black pixels P' for each cell C of the original image B1. While it is not physically possible to make a black pixel blacker, it is mathematically possible as illustrated in FIG. 5A. There, it can be seen that a select value x has been subtracted from each black pixel formerly having a value 0.0 so that each now has a value 0.0–x. In one example, the value x is selected as up to 10% of the dynamic range between the black and white pixel values, i.e., between 0.0 and 0.1 in the present example. All white pixels P of each cell C' are unaltered relative to the cell C at this stage. The step S2 can be expressed more generally as moving the value of each black pixel away from the value of the white pixels by a select amount x. Of course, as noted above, this moves the value of each pixel out of the valid dynamic range or physically realizable state which is in direct contrast to the standard methods.

Finally, in a step S3, the image defined by the modified halftone cells C' is subjected to error diffusion or a similar method to quantize the values of the pixels P' to physically realizable states. In a typical error diffusion method, input pixel values are examined and the output for each pixel—either "on" or "off"—is determined by comparing the input pixel value to a threshold t. Input pixel values greater than the threshold t are set to "on" while input pixel values less than the threshold t are set to "off." Unlike other halftoning methods, the difference or "error" between the input pixel value (e.g., 0.75) and the resulting binary output pixel value (e.g. 1) is not discarded. Instead, the error is propagated to adjacent pixels so that it may be accounted for or "recovered" at some point. Thus, for example, even though an adjacent pixel may have an actual input value less than the threshold, if an error from one or more previous pixels is added to the input pixel value of the adjacent pixel, the adjacent pixel may thereafter exceed the threshold so that the previous error(s) are recovered. The term error diffusion as used herein is intended to encompass any threshold-based halftoning method that propagates error.

FIG. 5B illustrates a halftone cell C that results when the cell C' of FIG. 5A is subjected to error diffusion in the step S3. All black pixels P' are defined by values less than the threshold t and, thus, are set to "0" and remain black. Because each black pixel P' of the cell C' has a value 0.0–x, error will be present and will be propagated to other pixels in the cell C'. This error varies from pixel to pixel depending upon the pixel values and the error diffusion algorithm. As shown, a first white pixel P1 receives a first error value fx that is subtracted from its input value. The resulting pixel value is still greater than the threshold t and the pixel P1 remains white. In contrast, a second white pixel P2 receives an error fx' that is subtracted from its value which results in a new pixel value that is less than the threshold t so the pixel P2 is altered to black or "0."

Figure 2C:
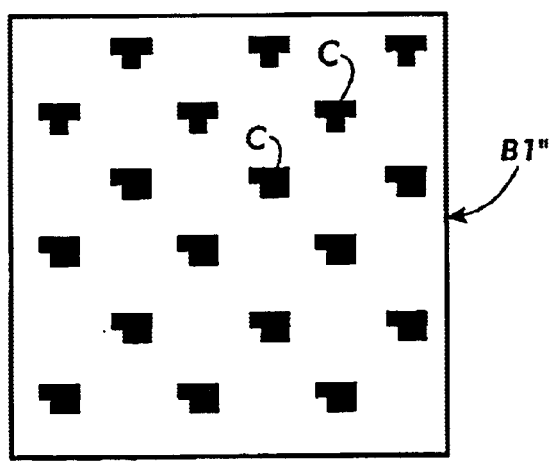
FIG. 2C illustrates the binary halftone image of FIG. 2A as darkened in accordance with the method of the present invention.

The image B1" resulting from application of the foregoing darkening method to the input image B1 is shown in FIG. 2C. It can be seen that all original black pixels P are present and halftone dot spacing is maintained. Those of ordinary skill in the art will recognize that, by increasing the blackness of all black pixels P in the input image B1, error is intentionally introduced into the error diffusion operation so that some white pixels P of the input image B1 are turned black by the error diffusion operation. It will also be recognized that due to the inherent properties of the error feedback, black pixels can only be introduced adjacent to existing black pixels, thus disabling any dispersed dot patterns as prevalent in FIG. 2B. As mentioned before, the dispersed dot patterns often lead to heightened image quality degradations in the presence of process variations.

It will also be recognized that the foregoing can easily introduce instabilities in the image if the error resulting from the error diffusion operation is not bounded. Allowing the input data to exceed the output dynamic range is inherently instable since the error can grow beyond any given bound. In a typical error diffusion method, where the input dynamic range is limited by the output dynamic range, the error is naturally bounded by ±½ of the dynamic range, i.e., error values are limited between −0.5 and 1.5. The total dynamic range of the error is thus twice the dynamic range of the input. However, in accordance with the present invention no natural error bound exists since the input dynamic range exceeds the output dynamic range, i.e.: input images can have values lighter than "white" or darker than "black". Therefor it has been deemed most preferred to include an algorithmic error bound into the process. This error bound limits the total accumulated error and in the examples given, the dynamic range of the error was limited to four times the. dynamic range of the input data. This allows for a sufficient error to develop that will alter the state of some white pixels without introducing instabilities into the image. It should be understood that other bounds might be used on the error range and that an increase in the bound allows a stronger effect at the cost of possible artifact, while a lower bound reduces the strength of the effect.

Figure 3C:
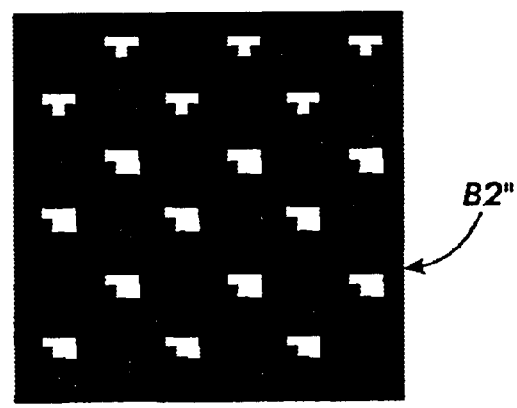
FIG. 3C illustrates the binary halftone image of FIG. 3A as lightened in accordance with the method of the present invention.
Figure 7:
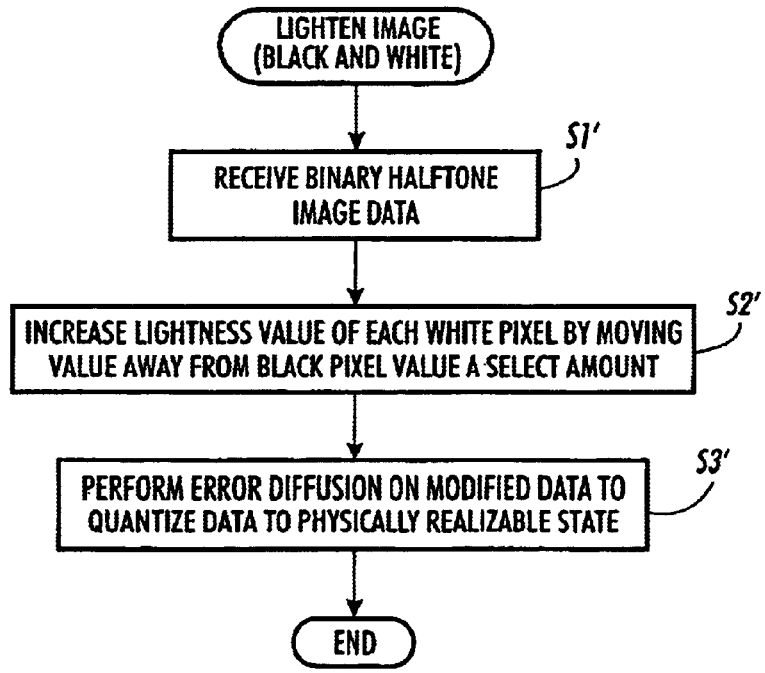

FIG. 7 discloses a method for lightening the image B2 shown in FIG. 3A to obtain the image B2" shown in FIG. 3C in accordance with the present invention. The lightening method is identical to the darkening method except that all white pixel values are adjusted away from the dark pixel values in the initial step, i.e.: white pixels are mapped to a value lighter than "white" while black pixels are maintained, thereby again exceeding the input dynamic range.

More particularly, the binary halftone image data is received in a step S1'. In a step S2', all white pixels of the input image are mathematically lightened or moved away from the black pixels by a select amount. In a step S3', error diffusion is used to move all pixel values back into the dynamic range. The error diffusion step S3' alters the state of some black pixels to white due to the error propagated thereto.

The invention has been described with reference to preferred embodiments. Modifications and alterations will occur to those of ordinary skill in the art to which the invention pertains upon reading and understanding this specification. It is intended that the invention be construed as including all such modifications and alterations insofar as they are encompassed by the following claims and equivalents.

Having thus described the preferred embodiments, what is claimed is:

1. A method for adjusting the lightness/darkness of a binary halftone image, said method comprising:
   receiving digital image data defining a binary halftone image in terms of a plurality of light pixels having a first value and a plurality of dark pixels having a second value;
   if said binary halftone image is to be lightened, adjusting said first value in a direction away from said second value by a select amount for each of said plurality of light pixels;
   if said binary halftone image is to be darkened, adjusting said second value in a direction away from said first value by a select amount for each of said plurality of dark pixels; and,
   performing error diffusion on said binary halftone image.

2. The method for adjusting lightness/darkness of a binary halftone image as set forth in claim 1, wherein:
   said plurality of light pixels are white pixels having a first value equal to one of 1 and 0; and,
   said plurality of dark pixels are black pixels having a second value equal to the other of 1 and 0.

3. The method for adjusting lightness/darkness of a binary halftone image as set forth in claim 1, wherein a dynamic range is defined inclusively between said first and second values and said select amount equals up to 10% of said dynamic range.

4. The method for adjusting lightness/darkness of a binary halftone image as set forth in claim 3, wherein said step of performing error diffusion comprises an error bounding step to limit error propagated in said error diffusion step.

5. A method for darkening a binary halftone image, said method comprising:
   receiving a binary halftone image defined by dark pixels having a first value and light pixels having a second value, said first and second values defining inclusively therebetween a dynamic range;
   for each of said dark pixels, adjusting said first value away from said second value to a new value outside said dynamic range;
   performing error diffusion on said binary halftone image to quantize said new value for each of said dark pixels into said dynamic range, said error diffusion changing said second value for at least some to said light pixels to said first value.

6. The method as set forth in claim 5, wherein said binary halftone image is defined by black pixels and white pixels.

7. The method as set forth in claim 6, wherein said step of adjusting said first value away from said second value comprises adjusting said first value by a select percentage of said dynamic range.

8. The method as set forth in claim 7, wherein said select percentage is less than or equal to 10%.

9. The method as set forth in claim 5, wherein said step of performing error diffusion comprises limiting an amount of propagated error.

10. A method for lightening a binary halftone image, said method comprising:
   receiving a binary halftone image defined by dark pixels having a first value and light pixels having a second value, said first and second values defining inclusively therebetween a dynamic range;
   for each of said light pixels, adjusting said second value away from said first value to a new value outside said dynamic range;
   performing error diffusion on said binary halftone image to quantize said new value for each of said light pixels into said dynamic range, said error diffusion changing said first value for at least some to said dark pixels to said second value.

11. The method as set forth in claim 10, wherein said binary halftone image is defined by black pixels and white pixels.

12. The method as set forth in claim 11, wherein said step of adjusting said second value away from said first value comprises adjusting said second value by a select percentage of said dynamic range.

13. The method as set forth in claim 12, wherein said select percentage is less than or equal to 10%.

14. The method as set forth in claim 10, wherein said step of performing error diffusion comprises limiting an amount of propagated error 15. A xerographic reproduction or other non-impact printing apparatus for adjusting the lightness/darkness of a binary halftone image, said apparatus comprising:

means for receiving digital image data defining a binary halftone image in terms of a plurality of light pixels having a first value and a plurality of dark pixels having a second value;

means for lightening said binary halftone image comprising means for adjusting said first value in a direction away from said second value by a select amount for each of said plurality of light pixels;

means for darkening said binary halftone image comprising means for adjusting said second value in a direction away from said first value by a select amount for each of said plurality of dark pixels; and, means for performing error diffusion on said binary halftone image.

* * * * *